Patented July 30, 1935

2,009,898

UNITED STATES PATENT OFFICE 2,009,898

TREATMENT OF HYDROCARBON OILS

Jacque C. Morrell, Chicago, Ill., assignor to Universal Oil Products Company, Chicago, Ill., a corporation of South Dakota No Drawing. Application November 11, 1929,
Serial No. 406,521

1 Claim. (Cl. 196—36)

This invention relates to the treatment of hydrocarbon oils and in particular to cracked hydrocarbon oils. It refers especially to the treatment of such oils in the vapor phase.

Heretofore, petroleum distillates have been treated in the vapor phase by passing the vapors through earthy material, such as fuller's earth, for the purpose of removing undesirable substances from the distillates but such processes have been directed to the removal of color forming compounds. Such processes have not been suitable for the removal of sulphur compounds, for even the simplest types present in petroleum distillates have been practically unaffected by the process. On the contrary, it is believed that sulphur compounds inhibit the proper reaction of the fuller's earth in refining the distillates.

In the present practice of the art, the oil vapors, for example, cracked hydrocarbon vapors, are passed through a bed or layer of fuller's earth which removes such compounds as the diolefins, or highly unsaturated compounds, presumably by the type of chemical action known as polymerization. It has been noted that the reaction is not so effective and the yield of distillate per ton of clay considerably cut down by the presence of sulphur compounds in the oil vapors. The present invention has for its purpose the promotion of the action of adsorbent earth by removing, in whole or in part, some of the interfering sulphur compounds which in itself is a desirable aim.

The present invention is particularly directed to the refining of cracked distillates from charging stocks containing a relatively high percentage of sulphur, which distillates have not been amenable to the process as heretofore practiced. In carrying out the process, a relatively small percentage of an oxygen derivative of nitrogen, such as nitric oxide, nitrogen dioxide, nitrogen trioxide, nitrogen tetroxide and nitrogen pentoxide preferably highly diluted with air or with inert gases, such as carbon dioxide, nitrogen, flue gas, etc., is incorporated with the oil vapors and the mixture passed thru the earthy adsorbent. The precaution of dilution is taken because some mixtures of oil vapors and nitrogen oxides are highly explosive. The oxides of nitrogen react particularly with sulphur compounds while the specific purpose of the adsorbent is to remove color forming compounds, such as the diolefins, or highly unsaturated compounds present in the cracked vapors.

In carrying out the process any suitable apparatus permitting the passage of the vapors and gaseous oxides through the treating mixture may be used. The vapors may be passed upwardly or downwardly, and necessary arrangements are made for the withdrawal of liquid products.

The removal of some of the sulphur compounds, and particularly those types which are most likely to interfere with the action of the adsorbent, permit the economic treatment of petroleum distillates from asphaltic base oils of high sulphur content, which distillates have not been heretofore economically treated owing to the low yield of distillate per ton of adsorbent. The oxides of nitrogen, which are gases, may be fed into the vapor line leading into the vessel containing the adsorbent material, or may be introduced thru a separate line directly into the container. Preferably the gasoline product should be washed with an alkaline solution before, during, or after condensation.

As an example of the results obtained by this process, a pressure distillate of 54 Baumé gravity containing 80% of gasoline and 20% pressure distillate bottoms with a sulphur content of 0.75 was subjected to distillation conditions and nitrogen dioxide diluted with flue gases added to the gasoline vapors and the mixture passed through the solid treating agent. The gasoline resulting from the treatment had a gravity of 58° Bé. and end boiling point of 432° F. The color of the gasoline was plus 25 Saybolt and the sulphur content 0.12%. The process is adapted to be directly connected to a cracking unit or to a re-run still, and vapors corresponding to the boiling range of any desired product may be treated.

I claim:

The method of refining hydrocarbon distillates which comprises mixing the vapors thereof with a nitrogen oxide diluted with an inert gas and passing the resultant mixture through adsorbent earthy material.

JACQUE C. MORRELL.